US012052395B2

(12) United States Patent
Morimoto

(10) Patent No.: US 12,052,395 B2
(45) Date of Patent: Jul. 30, 2024

(54) PAPER TYPE IDENTIFICATION APPARATUS WHICH IDENTIFIES A TYPE OF A SHEET BY READING FIRST SURFACE AND SECOND SURFACE OF THE SHEET AND IMAGE FORMING APPARATUS

(71) Applicant: CANON KABUSHIKI KAISHA, Tokyo (JP)

(72) Inventor: Kazusa Morimoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/128,012

(22) Filed: Mar. 29, 2023

(65) Prior Publication Data

US 2023/0319195 A1     Oct. 5, 2023

(30) Foreign Application Priority Data

Mar. 30, 2022   (JP) .................................. 2022-056636

(51) Int. Cl.
| | | |
|---|---|---|
| H04N 1/00 | (2006.01) | |
| H04N 1/23 | (2006.01) | |
| B41J 11/00 | (2006.01) | |
| G03G 15/00 | (2006.01) | |

(52) U.S. Cl.
CPC ..... *H04N 1/00092* (2013.01); *H04N 1/00037* (2013.01); *H04N 1/00076* (2013.01); *H04N 1/00082* (2013.01); *H04N 1/2323* (2013.01); *H04N 1/2392* (2013.01); *B41J 11/003* (2013.01); *G03G 15/6502* (2013.01); *G03G 15/6508* (2013.01); *G03G 15/6514* (2013.01); *G03G 2215/00751* (2013.01)

(58) Field of Classification Search
None
See application file for complete search history.

(56) References Cited

U.S. PATENT DOCUMENTS

| | | | | |
|---|---|---|---|---|
| 7,618,140 B2* | 11/2009 | Kato | ........................ | B41J 11/42 358/1.9 |
| 2007/0071461 A1* | 3/2007 | Kitano | ................... | B65H 29/14 399/16 |
| 2008/0225318 A1* | 9/2008 | Murakami | ......... | G03G 15/6529 358/1.12 |
| 2014/0079458 A1* | 3/2014 | Seto | ...................... | G01N 19/10 73/29.02 |

(Continued)

FOREIGN PATENT DOCUMENTS

JP        2020-123835 A     8/2020

OTHER PUBLICATIONS

U.S. Appl. No. 18/116,361, Kazusa Morimoto, filed Mar. 2, 2023.

*Primary Examiner* — Haris Sabah
(74) *Attorney, Agent, or Firm* — Venable LLP

(57) ABSTRACT

A paper type identification apparatus includes a passage configured to allow a sheet to be manually inserted thereinto, a reading sensor configured to read a surface of the sheet inserted into the passage and a controller configured to output a notification after reading a first surface of the sheet by the reading sensor. The notification is a notification to urge a user to read a second surface opposite to the first surface of the sheet by the reading sensor, and determine a type of the sheet based on a reading result of the first surface by the reading sensor and a reading result of the second surface by the reading sensor.

13 Claims, 12 Drawing Sheets

(56) References Cited

U.S. PATENT DOCUMENTS

2015/0246782 A1* 9/2015 Iwami .................. B65H 3/44
                                                   271/9.05
2017/0032228 A1* 2/2017 Wakai ................ G06K 15/023

* cited by examiner

| SHEET BRAND NAME | BASIS WEIGHT [gsm] | FIRST SURFACE PROPERTY | | | SECOND SURFACE PROPERTY | | | PAPER THICKNESS [μm] | SHEET CLASSIFICATION |
|---|---|---|---|---|---|---|---|---|---|
| | | INTEGRATED VALUE OF DIFFERENCE BETWEEN ADJACENT PIXELS | BRIGHTNESS | SHEET INFORMATION | INTEGRATED VALUE OF DIFFERENCE BETWEEN ADJACENT PIXELS | BRIGHTNESS | SHEET INFORMATION | | |
| AAAAA | 68 | 3000 | 50000 | PLAIN PAPER SHEET | 2800 | 50000 | PLAIN PAPER SHEET | 92 | PLAIN PAPER SHEET |
| ... | ... | ... | ... | ... | ... | ... | ... | ... | ... |
| BBBBB | 81.4 | 2000 | 53000 | PLAIN PAPER SHEET | 2000 | 53000 | PLAIN PAPER SHEET | 97 | PLAIN PAPER SHEET |
| ... | ... | ... | ... | ... | ... | ... | ... | ... | ... |
| CCCCC | 80 | 3500 | 47000 | RECYCLED PAPER SHEET | 6000 | 47000 | EMBOSSED PAPER SHEET | 104 | RECYCLED PAPER SHEET |
| ... | ... | ... | ... | ... | ... | ... | ... | ... | ... |
| DDDDD | 500 | 1700 | 50000 | COATED PAPER SHEET | 3000 | 34000 | PLAIN PAPER SHEET | 630 | ONE-SIDE COATED PAPER SHEET |
| ... | ... | ... | ... | ... | ... | ... | ... | ... | ... |

SHEET SETTING

| SHEET CLASSIFICATION | TYPE | BASIS WEIGHT [gsm] | |
|---|---|---|---|
| PLAIN PAPER SHEET 2 | PLAIN PAPER SHEET | 75-90 | RECOMMENDED |
| PLAIN PAPER SHEET 1 | PLAIN PAPER SHEET | 61-74 | |
| PLAIN PAPER SHEET 3 | PLAIN PAPER SHEET | 91-105 | |
| RECYCLED PAPER SHEET 2 | RECYCLED PAPER SHEET | 75-90 | |

TO BRAND IDENTIFICATION | SHEET AUTOMATIC IDENTIFICATION BACK SURFACE MEASUREMENT

CANCEL

FIG. 18

SHEET SETTING

| SHEET BRAND | TYPE | BASIS WEIGHT [gsm] | SHEET CLASSIFICATION | |
|---|---|---|---|---|
| AAAA | PLAIN PAPER SHEET | 81 | PLAIN PAPER SHEET 2 | RECOMMENDED |
| XXXXXXX | PLAIN PAPER SHEET | 81 | PLAIN PAPER SHEET 2 | |
| YYYYYYY | PLAIN PAPER SHEET | 81 | PLAIN PAPER SHEET 2 | |
| BBBB | | 70 | PLAIN PAPER SHEET 1 | |
| ZZZZZZZ | PLAIN PAPER SHEET | 90 | PLAIN PAPER SHEET 2 | |

TO BRAND IDENTIFICATION | SHEET AUTOMATIC IDENTIFICATION MEASUREMENT AGAIN

CANCEL

PAPER TYPE IDENTIFICATION APPARATUS WHICH IDENTIFIES A TYPE OF A SHEET BY READING FIRST SURFACE AND SECOND SURFACE OF THE SHEET AND IMAGE FORMING APPARATUS

BACKGROUND OF THE INVENTION

Field of the Invention

The present disclosure relates to a paper type identification apparatus which can identify a type of a sheet and an image forming apparatus having the paper type identification apparatus.

Description of the Related Art

Electrophotographic image forming apparatuses such as a copying machine, a printer, a facsimile machine, and a multifunction apparatus, form an image on a sheet conveyed in a conveyance path by performing each process of electrification, exposure, development, transfer, and fixing. There are various types of the sheets which can be used for image forming. The sheets differ in characteristics (physical properties), such as sheet thickness, a degree of smoothness, basis weight, and surface property, according to the type of the sheet. The optimal operation condition in each process of image forming changes according to the physical properties of the sheet to be used. Therefore, the image forming apparatus needs to change the conditions of operations, such as an adjustment value of each process, based on the type of sheet. Upon using the image forming apparatus, a user registers the type of the sheet to be used previously. However, in a case where the registered type of the sheet is incorrect, the image forming apparatus cannot form images under proper operating conditions. In this case, the normal image cannot be formed on the sheet. For example, abnormalities arise in the image formed on a sheet due to occurrence of jam, poor fixing, and a poor image density, etc.

Japanese Patent Application Laid-open No. 2020-123835 describes an image forming apparatus which identifies a type of a sheet by a measurement device (media sensor) which measures a feature amount of the sheet to perform image forming. The measurement device notifies the image forming apparatus of the measurement result of the sheet. The image forming apparatus specifies a paper profile that matches the measurement result, among a plurality of previously stored paper profiles. Therefore, the incorrect setting of the type of sheet is suppressed.

In some measurement devices which measure the feature amount of the sheet manually inserted by a user, only one side of the sheet is measured. In this case, only the feature amount of one side of the sheet is measured. It is noted that feature amounts of front surfaces (print surfaces) of the sheets are previously registered in the paper profile, and the image forming apparatus identifies the paper type by reading the front surface of the sheet when measuring the sheet by the measurement device. However, as to a sheet (for example, a recycled paper sheet) in which the feature amount of a front surface and that of a back surface differ from each other and the appearance of the front surface and the back surface is the same, there may be an increased risk of mistakenly measuring the front and back surfaces. The difference in the feature amount of the front surface and the back surface may cause incorrect detection of the paper type.

SUMMARY OF THE INVENTION

A paper type identification apparatus according to one aspect of the present disclosure includes: a passage configured to allow a sheet to be manually inserted thereinto; a reading sensor configured to read a surface of the sheet inserted into the passage; and a controller configured to: output a notification after reading a first surface of the sheet by the reading sensor, the notification being a notification to urge a user to read a second surface opposite to the first surface of the sheet by the reading sensor; and determine a type of the sheet based on a reading result of the first surface by the reading sensor and a reading result of the second surface by the reading sensor. An image forming apparatus for forming an image on a sheet based on an image forming condition according to another aspect of the present disclosure includes: a passage configured to allow a sheet to be manually inserted thereinto; a reading sensor configured to read a surface of the sheet inserted into the passage; a display; and a controller configured to: control the display to display a screen after reading a first surface of the sheet by the reading sensor, the screen being a screen to urge a user to read a second surface opposite to the first surface of the sheet; control the display to display a plurality of candidates of a type of the sheet based on a reading result of the first surface by the reading sensor and a reading result of the second surface by the reading sensor; and control the image forming conditions based on the type of the sheet selected from among the plurality of candidates displayed on the display.

Further features of the present invention will become apparent from the following description of exemplary embodiments (with reference to the attached drawings).

BRIEF DESCRIPTION OF THE DRAWINGS

FIG. 8 is an illustrative table of a paper type database.

FIG. 17 is an exemplary view of a brand candidate screen.
FIG. 18 is an exemplary view of a brand candidate screen.

DESCRIPTION OF THE EMBODIMENTS

In the following, at least one embodiment of the present disclosure is described with reference to the drawings.

<Image Forming Apparatus>

Figure 1:
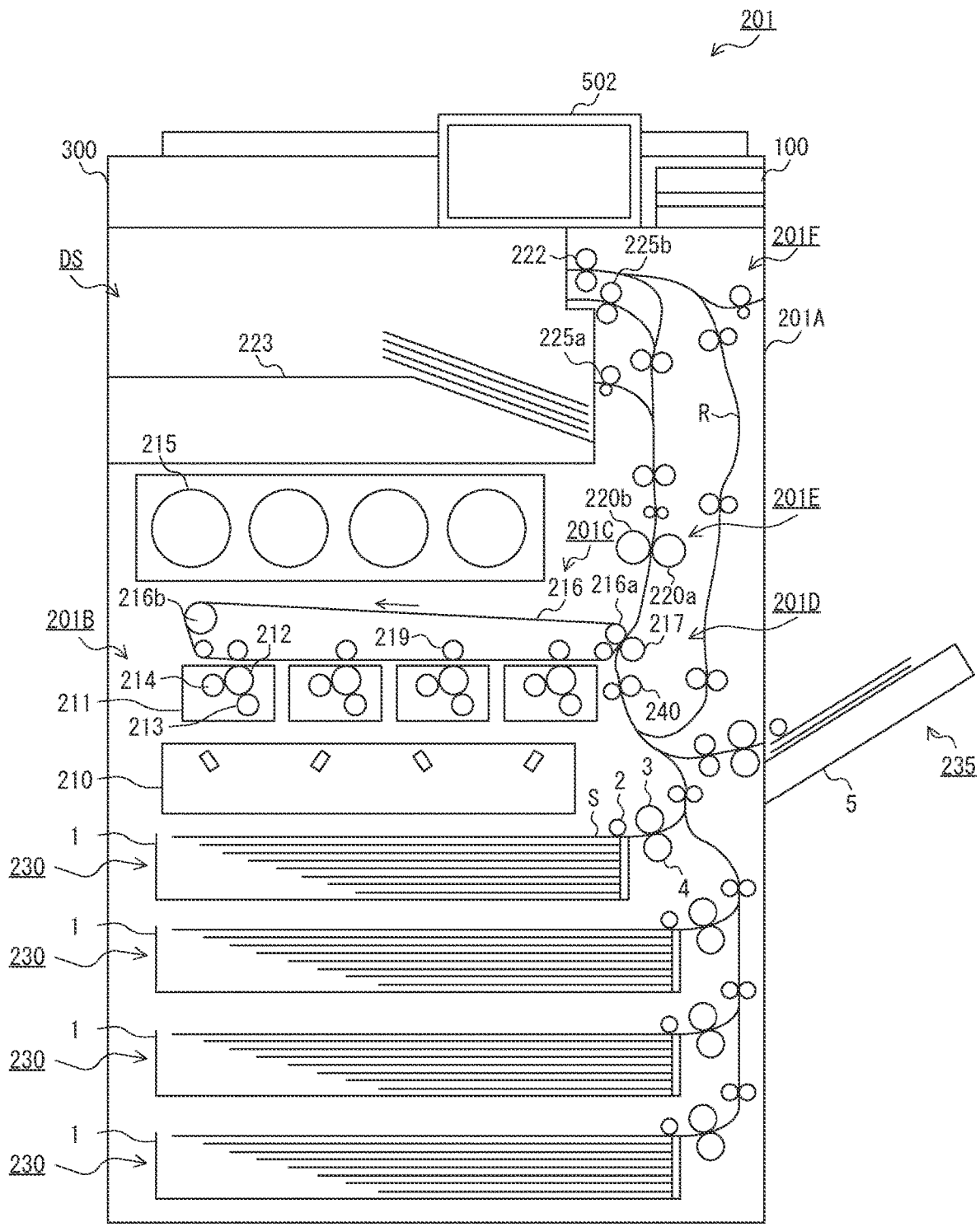
FIG. 1 is a configuration view of an image forming apparatus.

FIG. 1 is a configuration view of an image forming apparatus according to a first embodiment of this embodiment. An image forming apparatus 201 according to this embodiment is, for example, a laser beam printer of a tandem intermediate-transfer type using an electrophotographic process. The image forming apparatus 201 forms a full-color image or a monochrome image on a sheet S, which is a recording medium, and outputs the sheet S based on image data acquired from an external device, for example, a personal computer via a network or based on image data acquired from an image reading device 300.

The image forming apparatus 201 has, inside a main body 201A, components for forming an image, and includes, on the top of the main body 201A, an image reading device 300, an operation unit 502, and a paper type identification apparatus 100. A delivery space DS for receiving the sheet S to be delivered thereinto after image formation is defined between the main body 201A of the image forming apparatus 201 and the image reading device 300.

The image reading device 300 is a scanner which reads an image from an original to generate image data. The image reading device 300 is used, for example, at the time of processing of copying an original. The operation unit 502 is a user interface including an input interface and an output interface. Examples of the input interface include various key buttons and a touch panel. Examples of the output interface include a display and a speaker. A user can input various instructions to the image forming apparatus 201 via the operation unit 502. The paper type identification apparatus 100 is a device for identifying the type of the sheet S that is used by the image forming apparatus 201 for image formation (printing). Details of the paper type identification apparatus 100 will be described later.

The image forming apparatus 201 includes, in the main body 201A, an image forming unit 201B, an intermediate transfer unit 201C, a secondary transfer unit 201D, a fixing device 201E, and cassette sheet-feeding units 230.

The cassette sheet-feeding units 230 each feed sheets S from a corresponding one of sheet-feeding cassettes 1 accommodating the sheets S. The cassette sheet-feeding unit 230 includes a pickup roller 2 and a separation unit. The separation unit includes a feed roller 3 and a retard roller 4 for separating sheets S sent out from the pickup roller 2. The sheets S are fed one by one from the sheet-feeding cassette 1 by the pickup roller 2 and the separation unit. In this embodiment, a configuration in which a plurality of (in this example, four) cassette sheet-feeding units 230 are provided is described. However, any number of cassette sheet-feeding units 230 may be provided. The sheet S fed from the cassette sheet-feeding unit 230 is conveyed to a registration roller pair 240 along a conveyance path.

The sheet S can be fed from a unit other than the cassette sheet-feeding unit 230, that is, from a manual sheet-feeding unit 235. The manual sheet-feeding unit 235 includes a manual feeding tray 5 for receiving sheets S placed by a user. Similar to the cassette sheet-feeding unit 230, the manual sheet-feeding unit 235 includes a pickup roller and a separation unit, and sheets S are fed one by one from the manual feeding tray 5. The sheet S fed from the manual sheet-feeding unit 235 is also conveyed to the registration roller pair 240 along a conveyance path.

The image forming unit 201B is of a four-drum full-color type, and includes a laser scanner 210 and four process cartridges 211. The four process cartridges 211 form toner images of four colors, specifically, yellow (Y), magenta (M), cyan (C), and black (K). Each process cartridge 211 includes a photosensitive drum 212, a charging device 213, and a developing device 214. Toner cartridges 215 are arranged above the process cartridges 211. The toner cartridges 215 replenish the respective developing devices 214 with toner.

The intermediate transfer unit 201C includes an intermediate transfer belt 216 wound around a drive roller 216a and a tension roller 216b. On an inner side of the intermediate transfer belt 216, there are provided four primary transfer rollers 219 which are in abutment against the intermediate transfer belt 216 at positions opposing the photosensitive drums 212. The intermediate transfer belt 216 is rotated in the arrow direction by the drive roller 216a driven by a drive unit (not shown).

The secondary transfer unit 201D includes a secondary transfer roller 217 provided so as to sandwich the intermediate transfer belt 216 at a position opposing the drive roller 216a. The fixing device 201E is provided on a downstream side of the secondary transfer roller 217 in a conveyance direction of the sheet S, and includes a pressure roller 220a and a heating roller 220b. On a downstream side of the fixing device 201E in the conveyance direction of the sheet S, there are arranged a first delivery roller pair 225a, a second delivery roller pair 225b, and a duplex-printing reversing unit 201F. The duplex-printing reversing unit 201F includes a reversing roller pair 222 and a re-conveyance passage R. The reversing roller pair 222 is rotatable in forward and reverse directions. The re-conveyance passage R allows the sheet S having an image formed on one side thereof to be conveyed to the image forming unit 201B.

The image forming apparatus 201 having the configuration as described above operates as follows. The image forming apparatus 201 acquires image data from the image reading device 300 or from an external device and forms an image corresponding to the image data on the sheet S. At this time, the image forming apparatus 201 performs each process of the image formation based on operation conditions given in accordance with a type of the sheet S.

The image forming unit 201B uses the charging device 213 to uniformly charge surfaces of the photosensitive drums 212 to an electric potential having a predetermined polarity. The laser scanner 210 irradiates the uniformly charged surfaces of the photosensitive drums 212 with corresponding laser beams modulated based on the image data. In this way, electrostatic latent images for corresponding colors (yellow, magenta, cyan, and black) are formed on the respective surfaces of the photosensitive drums 212.

The image forming unit 201B uses the developing devices 214 to develop the electrostatic latent images formed on the photosensitive drums 212. The electrostatic latent images are developed on the photosensitive drums 212 with toners of corresponding colors so that toner images of the corresponding colors are formed on the photosensitive drums 212. The toner images are sequentially transferred from the photosensitive drums 212 to the rotating intermediate transfer belt 216 in superimposition by the primary transfer rollers 219. In this way, a full-color toner image is formed on the intermediate transfer belt 216. The intermediate transfer belt 216 rotates to convey the toner image to the secondary transfer unit 201D.

Concurrently with such operation of forming a toner image, the sheets S are conveyed one by one by the cassette sheet-feeding unit 230 or the manual sheet-feeding unit 235 to the registration roller pair 240. The registration roller pair 240 corrects the skew of the sheet S conveyed to the registration roller pair 240. After the skew is corrected, the sheet S is conveyed by the registration roller pair 240 to the secondary transfer unit 201D in synchronization with the timing at which the toner image borne on the intermediate transfer belt 216 is conveyed to the secondary transfer unit 201D. The secondary transfer unit 201D transfers the full-color toner image from the intermediate transfer belt 216 onto the sheet S with secondary transfer bias applied to the secondary transfer roller 217.

The sheet S having the toner image transferred thereto is conveyed to the fixing device 201E. The fixing device 201E sandwiches and conveys the sheet S with a roller nip portion defined by the pressure roller 220a and the heating roller 220b. The fixing device 201E heats the sheet S with the heating roller 220b at the time of sandwiching and conveying the sheet S, to thereby melt and mix the toners of respective colors on the sheet S. Further, the fixing device 201E presses the sheet S with the pressure roller 220a, to thereby fix the melted and mixed toners to the sheet S. At this time, the viscosity of the melted toner generates a sticking force to the heating roller 220b on the sheet S.

Figure 2A:
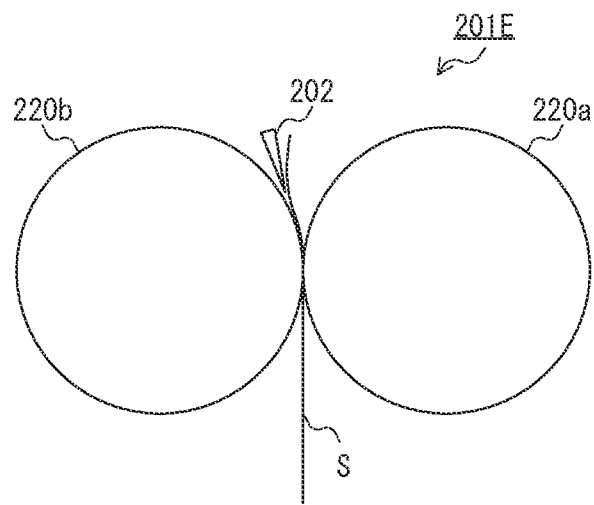
FIG. 2A and FIG. 2B are enlarged views of a fixing device.
Figure 2B:
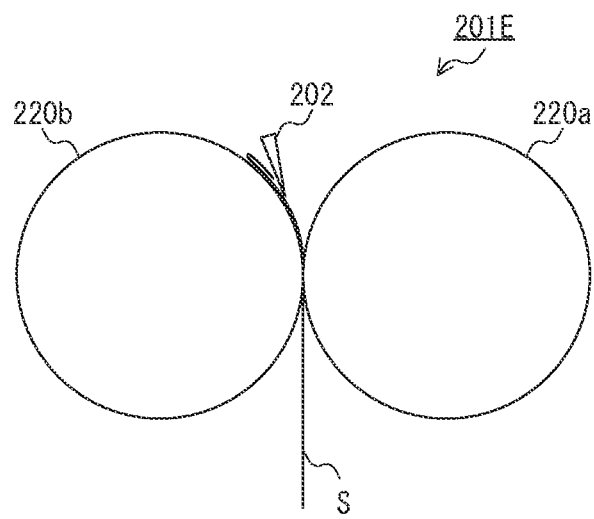

FIG. 2A and FIG. 2B are enlarged views of the fixing device 201E. When the stiffness (strength) of the sheet S is small, the sticking force to the heating roller 220b generated on the sheet S may cause the sheet S to be rolled up by the heating roller 220b being rotated (FIG. 2B). Thus, a separation plate 202 which separates the sheet S is provided on a downstream side of the heating roller 220b in the conveyance direction of the sheet S (FIG. 2A).

The image forming apparatus 201 may determine a state of the separation plate 202 in accordance with a type of the sheet S. For example, when the sheet S of a type having a small stiffness is subjected to image formation, the separation plate 202 is arranged such that a distal end of the separation plate 202 is in contact with a surface of the heating roller 220b as illustrated in FIG. 2A, to thereby separate the sheet S from the heating roller 220b. When the sheet S of a type having a large stiffness is subjected to image formation, the sheet S is not rolled up by the heating roller 220b. Thus, the separation plate 202 is arranged such that the distal end of the separation plate 202 is not in contact with the surface of the heating roller 220b. In this way, the surface of the heating roller 220b can be prevented from being worn by the separation plate 202.

The sheet S having the image fixed thereto is delivered to the delivery space DS by any one of the first delivery roller pair 225a or the second delivery roller pair 225b. The sheet S is placed on a placement portion 223 provided in a protruding manner on a bottom surface of the delivery space DS. When images are formed on both sides of the sheet S, the sheet S having an image fixed on one side thereof is conveyed by a reversing roller pair 222 to the re-conveyance passage R. The sheet S is conveyed again to the image forming unit 201B, and an image is formed on another side of the reversed sheet S.

<Controller>

Figure 3:
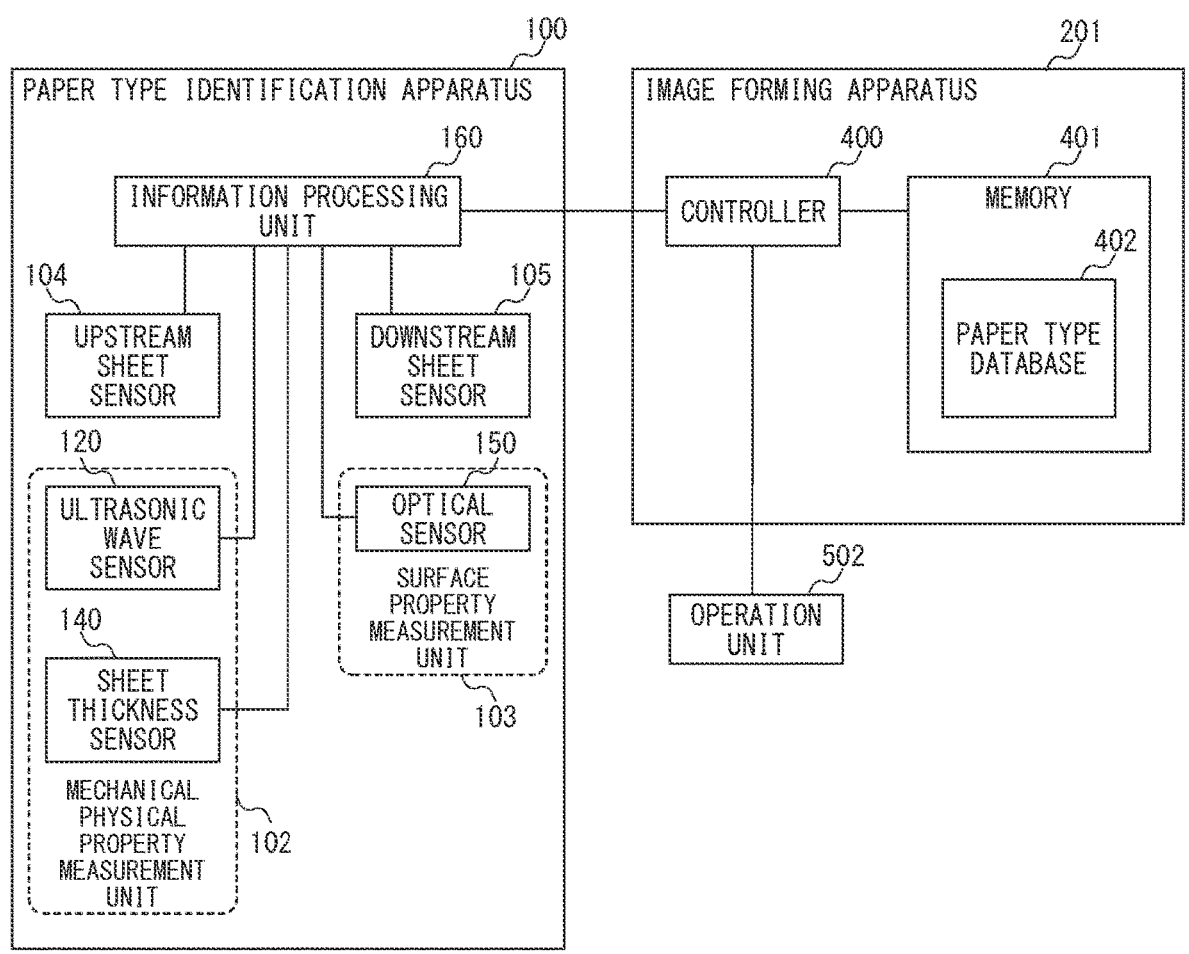
FIG. 3 is a configuration diagram of a controller.

FIG. 3 is an explanatory diagram of a controller which controls the operation of such image forming apparatus 201. A controller 400 is, for example, an information processing device including a central processing unit (CPU). The controller 400 may be achieved by, for example, a microprocessor unit (MPU) or an application specific integrated circuit (ASIC). The controller 400 controls the above-mentioned image forming processing performed by the image forming apparatus 201. Further, in this embodiment, the controller 400 is connected to the paper type identification apparatus 100 to control the paper type identification apparatus 100. A memory 401 and the operation unit 502 are connected to the controller 400. The memory 401 includes a paper type database 402. The paper type database 402 stores pieces of information such as a feature amount of various brands of sheets, parameters of operation condition of each component at the time of optimum image formation, whether or not to allow passage of sheets in the image forming apparatus 201, and usable sheet feeding ports.

The paper type identification apparatus 100 includes an information processing unit 160. The information processing unit 160 is an information processing device achieved by, for example, a CPU, an MPU, or an ASIC. The information processing unit 160 is communicably connected to the controller 400 and can operate in cooperation with the controller 400. The information processing unit 160 has an upstream sheet sensor 104, a downstream sheet sensor 105, a mechanical physical property measurement unit 102, and a surface property measurement unit 103 connected thereto. The mechanical physical property measurement unit 102 includes an ultrasonic wave sensor 120 and a sheet thickness sensor 140. The surface property measurement unit 103 includes an optical sensor 150. The information processing unit 160 controls operations of the upstream sheet sensor 104, the downstream sheet sensor 105, the mechanical physical property measurement unit 102, and the surface property measurement unit 103 and acquires respective measurement results.

The upstream sheet sensor 104 is a sensor to detect insertion of the sheet S to the paper type identification apparatus 100. The information processing unit 160 starts a measurement sequence of the feature amount of the sheet S upon detection of the sheet S by the upstream sheet sensor 104. The downstream sheet sensor 105 is a sensor to detect that the sheet S reached an inner-most part (an abutment portion, described later) to which the sheet S in the paper type identification apparatus 100 can be inserted. The ultrasonic wave sensor 120 is a sensor used for measurement of the basis weight of the sheet S. The sheet thickness sensor 140 is a sensor used for the measurement of the sheet thickness of sheet S. The optical sensor 150 is a sensor used for measurement of surface property information such as an integrated value of the difference between adjacent pixels of the sheet S, brightness, and the like. The integrated value of the difference between adjacent pixels is an integrated value of the difference between detection values (measurement results) of adjacent pixels. The optical sensor 150 outputs the brightness value for each pixel as a measurement result. The information processing unit 160 stores the measurement result, and generates surface property information based on the measurement result. The details of the ultrasonic wave sensor 120, the sheet thickness sensor 140, and the optical sensor 150 are described later.

The information processing unit 160 transmits, to the controller 400, the mechanical physical property information (basis weight and sheet thickness) acquired by the mechanical physical property measurement unit 102 and the surface property information acquired by the surface property measurement unit 103. The controller 400 determines the paper type of the sheet S based on the acquired surface property. Then, the controller 400 identifies, by the paper type database 402, the brand of the sheet S based on the paper type and the mechanical physical property information (basis weight and sheet thickness) and display the brand on a display of the operation unit 502.

<Type of Sheet Used for Image Forming Apparatus>

Operation conditions of each component for each process given at the time of image forming processing (conveyance speed and fixing temperature given at the time of fixing, and transfer voltage given at the time of secondary transfer) differ depending on the feature amount (physical property), such as a basis weight, a stiffness, a surface property, and a material, of the sheet S subjected to image formation. Thus, it is important to grasp in advance a type of the sheet S to be used at the time of image formation.

There may be some limitations in setting the sheet S to a sheet feeding port of the image forming apparatus 201. The sheet feeding port is the sheet-feeding cassette 1 or the manual feeding tray 5. For example, some thick paper sheets having a high stiffness can be fed only from the manual feeding tray 5 with a conveyance path having a small curvature. Coated paper sheets having a smooth surface texture and a strong adhesion between sheets are required to be fed one by one from the manual feeding tray 5. Paper sheets made of pulp as a raw material generally have different bending stiffnesses in length and width directions because of bias in orientation directions of pulp fibers (fiber orientation) that occurs due to a manufacturing method. Thus, for some paper sheets made of pulp as a raw material, there is given a recommended orientation of the sheet in length and width directions at the time of setting the sheet to the sheet feeding port so that the bending stiffness against the bending in the conveyance path becomes smaller. Further, for one-side coated paper sheets obtained by coating only one side of a plain paper sheet, an orientation in up-and-down directions is designated at the time of setting in order to perform image formation on the coated side.

There are also some sheets which cannot be used in the image forming apparatus 201. For example, in a case of a thick paper sheet having an excessively high stiffness, conveyance of the sheet may be stopped due to resistance generated at the time of conveying the sheet along a bent conveyance path. A thin paper sheet having an excessively low stiffness is strongly affected by the sticking force generated between the melted toner and the heating roller 220b at the time of passage through the fixing device 201E as described above. Thus, there is a possibility that a paper sheet having an excessively low stiffness is not separated from the heating roller 220b by the separation plate 202 and is directly wound around the heating roller 220b (FIG. 2B). Further, in a case of a synthetic paper sheet which is not made of pulp but of a synthetic resin as raw material, there is a possibility that the sheet is melted by heating in the fixing device 201E and thereby contaminates the heating roller 220b.

<Paper Type Identification Apparatus>

Figure 4A:
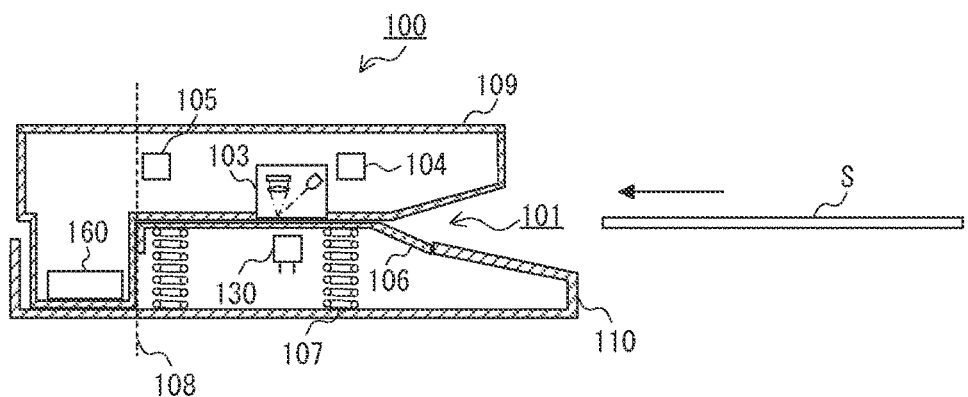
FIG. 4A and FIG. 4B are explanatory views of a paper type identification apparatus.
Figure 4B:
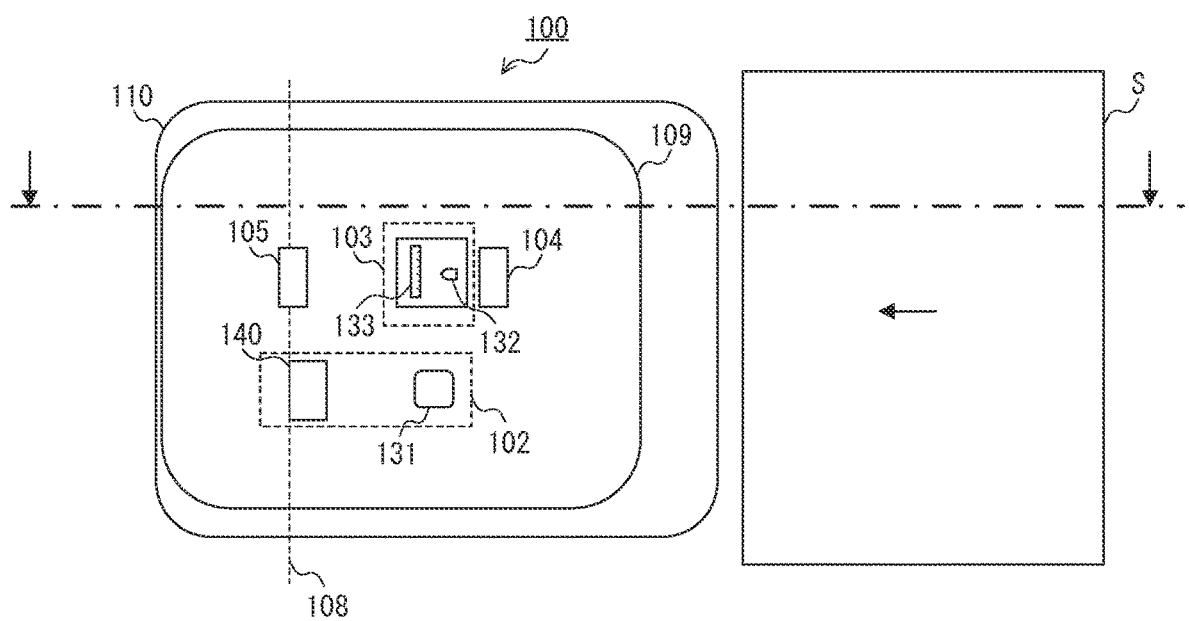
Figure 5A:
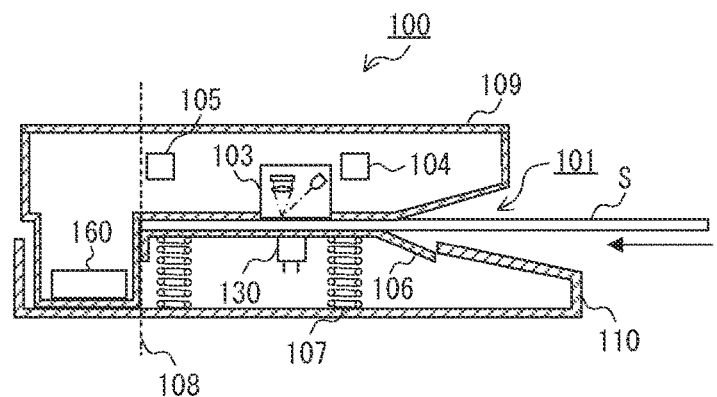
FIG. 5A and FIG. 5B are explanatory views of the paper type identification apparatus.
Figure 5B:
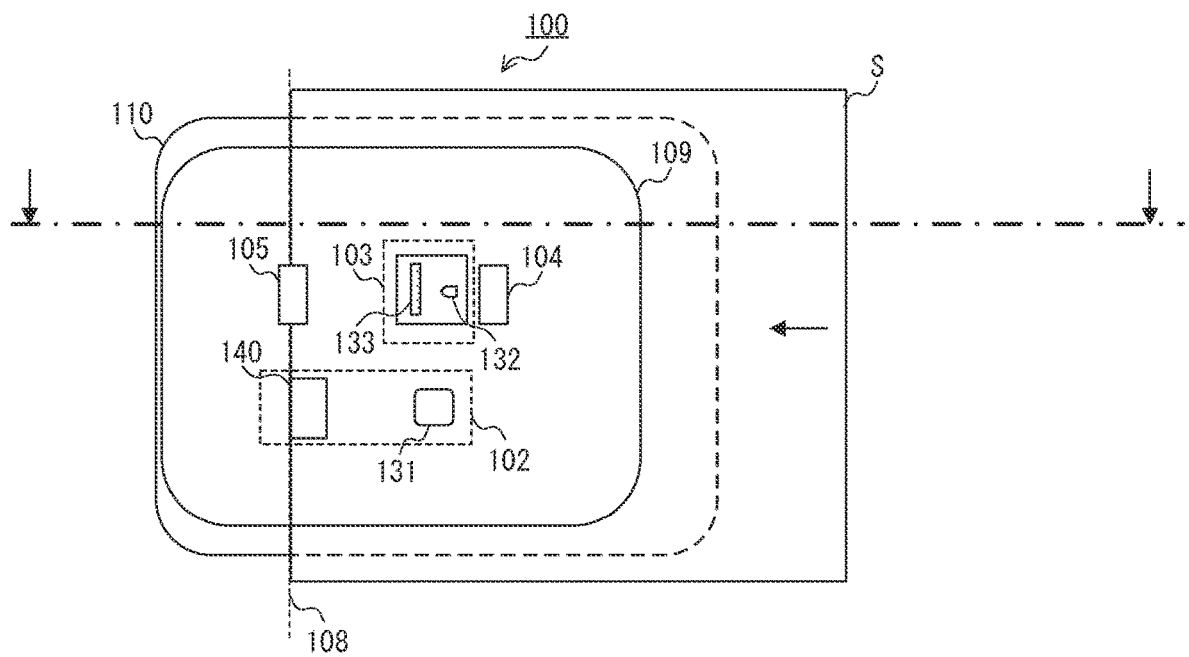
Figure 6:
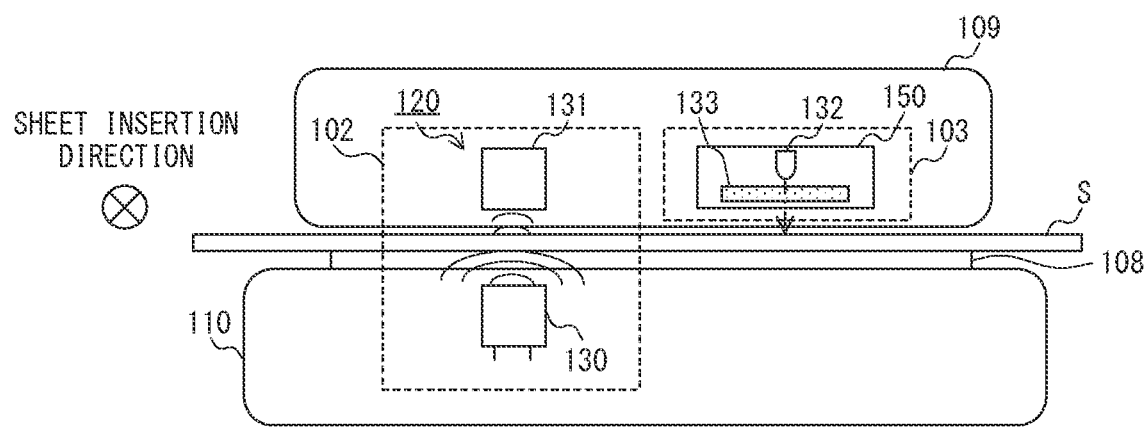
FIG. 6 is an explanatory view of the paper type identification apparatus.

FIG. 4A, FIG. 4B, FIG. 5A, FIG. 5B, and FIG. 6 are explanatory views of the paper type identification apparatus 100. FIG. 4A and FIG. 4B show a state before the sheet S is inserted into the paper type identification apparatus 100. FIG. 5A and FIG. 5B show a state in which the sheet S has been inserted into the paper type identification apparatus 100. FIG. 4A and FIG. 5A are views of the paper type identification apparatus 100 as seen from a lateral side (front side of the image forming apparatus 201 of FIG. 1). FIG. 4B and FIG. 5B are views of the paper type identification apparatus 100 as seen from an upper side. FIG. 6 is a view of the paper type identification apparatus 100 as seen in an insertion direction of the sheet S.

The paper type identification apparatus 100 has a groove portion 101 serving as a passage configured to allow the sheet S subjected to identification to be inserted thereinto, and measures the feature amount of the sheet S inserted from the groove portion 101. The insertion of the sheet S is performed manually by a user. The groove portion 101 includes an upper block 109 in an upper part and a lower block 110 in a lower part. The groove portion 101 is a passage configured to allow a sheet to be manually inserted.

On a groove-portion inner side of the lower block 110, a sheet pressing member 106 is provided. The sheet pressing member 106 is urged by an urging member 107 toward the upper block 109 side. The sheet S is inserted while pushing away the sheet pressing member 106 downward. The upper block 109 projects at an end portion of the sheet pressing member 106 (innermost portion to which the sheet S can be inserted) toward the lower block 110 side, thereby forming an abutment portion 108. The abutment portion 108 restricts the insertion of the sheet S. Thus, the sheet S can only be inserted to the abutment portion 108. The information processing unit 160 is arranged on an inner side beyond the abutment portion 108.

The measurement unit for the feature amount of the sheet S includes the mechanical physical property measurement unit 102 and the surface property measurement unit 103, as described above. As the sheet S passes through the measurement unit, the feature amount of the sheet S, such as basis weight, a surface property, and a sheet thickness, are acquired. The upstream sheet sensor 104 is arranged on an upstream side of the surface property measurement unit 103 in the insertion direction of the sheet S. The downstream sheet sensor 105 is arranged in the vicinity of the abutment portion 108 on the upstream side in the insertion direction of the sheet S. That is, the upstream sheet sensor 104 is arranged at an insertion start position of the sheet S, and the downstream sheet sensor 105 is arranged at an insertion end position of the sheet S. The upstream sheet sensor 104 and the downstream sheet sensor 105 each detect the inserted sheet S.

In the mechanical physical property measurement unit 102, as illustrated in FIG. 6, there are provided an ultrasonic wave emitter 130 on the lower block 110 side and an ultrasonic wave receiver 131 on the upper block 10) side such that the ultrasonic wave emitter 130 and the ultrasonic wave receiver 131 are arranged across an insertion passage along which the sheet S is to be inserted. The ultrasonic wave emitter 130 and the ultrasonic wave receiver 131 form the ultrasonic wave sensor 120. The mechanical physical property measurement unit 102 transmits and receives ultrasonic waves with the ultrasonic wave sensor 120 via the insertion passage of the sheet S, thereby being capable of detecting a basis weight of the sheet S. The basis weight is a mass of the sheet S per unit area, and is represented by a unit "gsm".

The ultrasonic wave emitter 130 and the ultrasonic wave receiver 131 are each formed of a piezoelectric element (also referred to as "piezo element"), which is an element for mutual conversion between a mechanical displacement and an electric signal, and an electrode terminal. The ultrasonic wave emitter 130 generates ultrasonic waves through oscillation of the piezoelectric element in response to input of a pulse voltage having a predetermined frequency to the electrode terminal. The generated ultrasonic waves propagate through air. Upon arrival of the ultrasonic waves to the sheet S, the ultrasonic waves cause the sheet S to vibrate. The ultrasonic waves generated in the ultrasonic wave emitter 130 propagate to the ultrasonic wave receiver 131 via the sheet S. The piezoelectric element of the ultrasonic wave receiver 131 causes the electrode terminal to generate an output voltage corresponding to an amplitude of the received ultrasonic waves. The output voltage has a voltage value corresponding to the basis weight of the sheet S. The output voltage is transmitted as a measurement value to the information processing unit 160.

As compared to a case in which the sheet S is absent between the ultrasonic wave emitter 130 and the ultrasonic wave receiver 131, the output voltage generated by the ultrasonic waves transmitted via the sheet S is reduced. The information processing unit 160 calculates a transmittance of the sheet S in accordance with a ratio of an output voltage given in the presence of the sheet S and an output voltage given in the absence of the sheet S. The transmittance of the ultrasonic waves varies depending on the thickness of the sheet S. Thus, the information processing unit 160 can estimate the basis weight of the sheet S with a conversion formula for an ultrasonic wave transmittance coefficient and a basis weight. In this way, the basis weight of the sheet S is detected with the ultrasonic wave sensor 120.

The upstream sheet sensor 104 which is provided in the upper block 109 and located on the upstream side of the surface property measurement unit 103 in the insertion direction of the sheet S detects insertion of the sheet S into the paper type identification apparatus 100. The downstream sheet sensor 105 which is provided in the upper block 109 and located on the downstream side of the surface property measurement unit 103 in the insertion direction of the sheet S detects that the completely inserted sheet S has reached the abutment portion 108.

The sheet thickness sensor 140 is arranged near the abutment portion 108. The sheet thickness sensor 140 is of a lever type. In the sheet thickness sensor 140, a lever tilts in accordance with a thickness of the sheet S so that an encoder rotates in accordance with the tilting amount of the lever. During rotation of the encoder, the sheet thickness sensor 140 transmits a pulse signal as a measurement value of the sheet thickness to the information processing unit 160. The sheet thickness sensor 140 is arranged somewhat on the downstream side in the insertion direction of the sheet S with respect to the downstream sheet sensor 105 so that the sheet thickness can be measured upon detection of the sheet S by the downstream sheet sensor 105.

As described above, the surface property measurement unit 103 includes the optical sensor 150 for detecting the surface property of the sheet S. The optical sensor 150 includes a light emitter 132 and a line sensor 133. The optical sensor 150 is a contact image sensor (CIS), for example. The light emitter 132 is, for example, a light emitting diode (LED). The line sensor 133 is formed of an array of a plurality of light receiving elements. For example, the line sensor 133 may be a CMOS line sensor including CMOS sensors as light receiving elements.

As illustrated in FIG. 6, the surface property measurement unit 103 (optical sensor 150) includes the light emitter 132 and the line sensor 133 on the upper block 109 side. In the line sensor 133, a plurality of light receiving elements are arranged in a direction orthogonal to the insertion direction of the sheet S in the paper type identification apparatus 100. Thus, the line sensor 133 detects the surface of the sheet S along one line in the direction crossing the insertion direction of the sheet S. The line sensor 133 can detect a sheet surface region with a resolution corresponding to a pixel size and an imaging magnification of the optical system.

A light amount of reflected light from the sheet S to the line sensor 133 changes according to the surface property of the sheet S. For example, as compared to a plain paper sheet, a surface of a coated paper sheet has a higher degree of smoothness (i.e., there is little unevenness). Therefore, as compared to the plain paper sheet, the coated paper sheet has larger amount of specular light and smaller amount of diffused reflection light (diffusion light). That is, the amount of the reflected light substantially represents the degree of smoothness of the surface of the sheet S. By using at least one of a specular reflection light amount and a diffused reflection light amount which enters the line sensor 133, the type of the sheet S can be determined. The line sensor 133 is configured such that the reflected light may be sampled based on a clock signal of a predetermined sampling frequency. The method of measuring surface property of the sheet S using the surface property measurement unit 103 in the present embodiment is performed using two or more sampling results.

The surface property measurement unit 103 is required to hold the sheet S at an optical focus position. Thus, the urging member 107 urges the sheet S toward the surface property measurement unit 103 side by the sheet pressing member 106 to stabilize a posture of the sheet S. In this way, variation in position and posture of the sheet S at the time of detecting the surface of the sheet S is reduced, therefore, the surface property measurement unit 103 can stably detect the surface property. The urging member 107 is set so as to press the inserted sheet S toward the surface property measurement unit 103 side with a force of about 100 gf.

Figure 7:
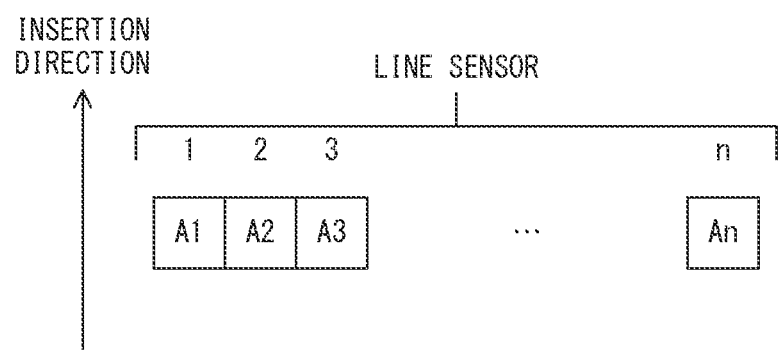
FIG. 7 is an explanatory view of a line sensor.

FIG. 7 is an explanatory view of the line sensor 133. The line sensor 133 can detect an image of n pixels in a direction orthogonal to the insertion direction of the sheet S at once. Therefore, n light receiving elements are arranged in series in the direction orthogonal to the insertion direction of the sheet S, for example.

<Surface Property Information>

The information processing unit 160 performs a digital process on the image detected by the optical sensor 150 to acquire a detection value (luminance value) for each pixel. The detection value (luminance value) is accumulated in the memory inside the information processing unit 160. The information processing unit 160 acquires the integrated value of difference between adjacent pixels and brightness as surface property information based on the detection value accumulated in the memory. The information processing unit 160 accumulates the surface property information in the memory.

The integrated value of difference between adjacent pixels is, as described above, the integrated value of the difference between the detection values (luminance value) of adjacent pixels in a direction of one line, and serves as an index representing unevenness of the surface of the sheet S. In FIG. 7, assuming that the detection value (sampling result of one time) of each pixel is "A1" to "An" according to the position of a pixel, the integrated value of difference between adjacent pixels k is represented by the following formula:

$$k=(A2-A1)+(A3-A2)\ldots+(An-A(n-1)).$$

The brightness is an integrated value of the detection values of the pixels detected by the optical sensor 150, and is a parameter correlated with the reflectance (lightness) of the sheet S. For example, a transparent film made of a resin such as PET has a small amount of the reflected light, and hence the brightness is measured as being low. As to the sheet S that has a geometrical irregularity shape on its surface as in a case of an embossed paper sheet, it has a large luminance difference between adjacent pixels due to the irregularities, and hence the integrated value of difference between adjacent pixels is large. A recycled paper sheet has a non-uniform fiber orientation, and pulp fibers are shortened due to several recycling processes. As a result, the measured surface property tends to be rough. The coated paper sheet appears to have less irregularities due to the presence of the coating layer on the surface. Thus, the integrated value of difference between adjacent pixels tends to be small.

<Paper Type Database>

FIG. 8 is an illustrative table of the paper type database 402 stored in the memory 401 of the image forming apparatus 201. In the paper type database 402, the feature amount measured by the paper type identification apparatus 100 is stored in relation with brand information. The feature amount includes physical property value (basis weight, sheet thickness), surface property information (first surface property) that represents surface property of a front surface (print surface), and surface property information (second surface property) that represents surface property of a back surface. The surface property information further includes the integrated value of difference between adjacent pixels and brightness.

<Paper Type Identification>

Figure 9:
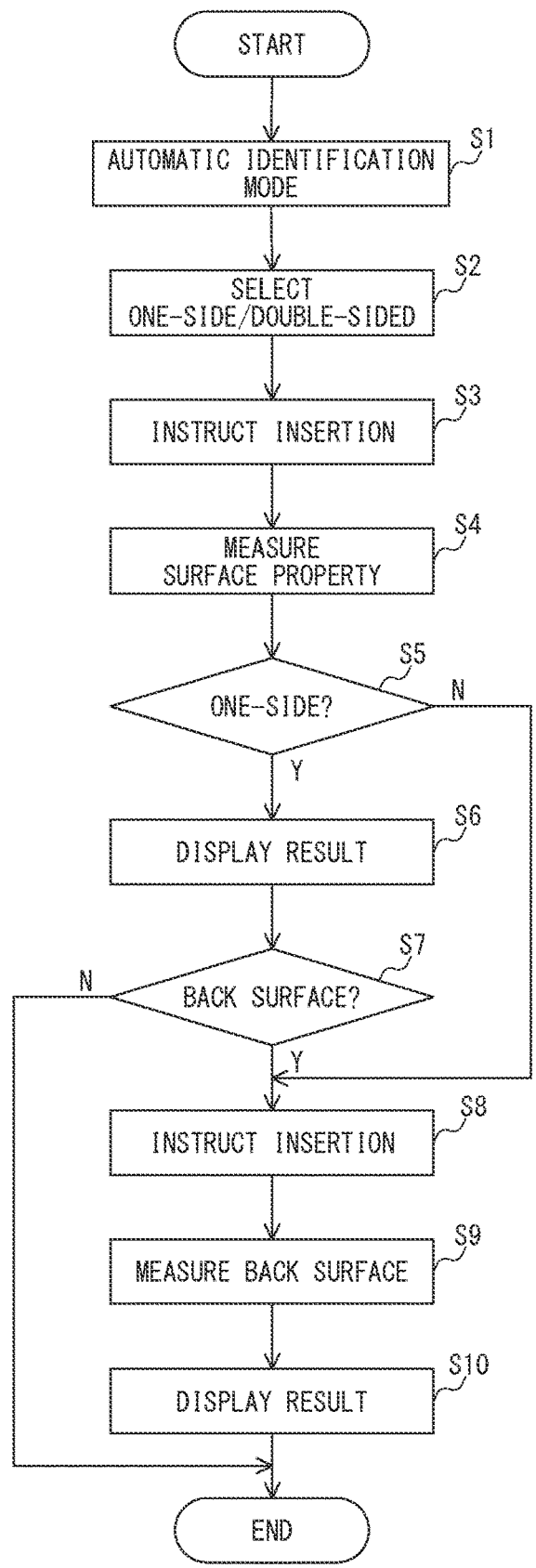
FIG. 9 is a flow chart representing a parameter acquisition process.
Figure 10:
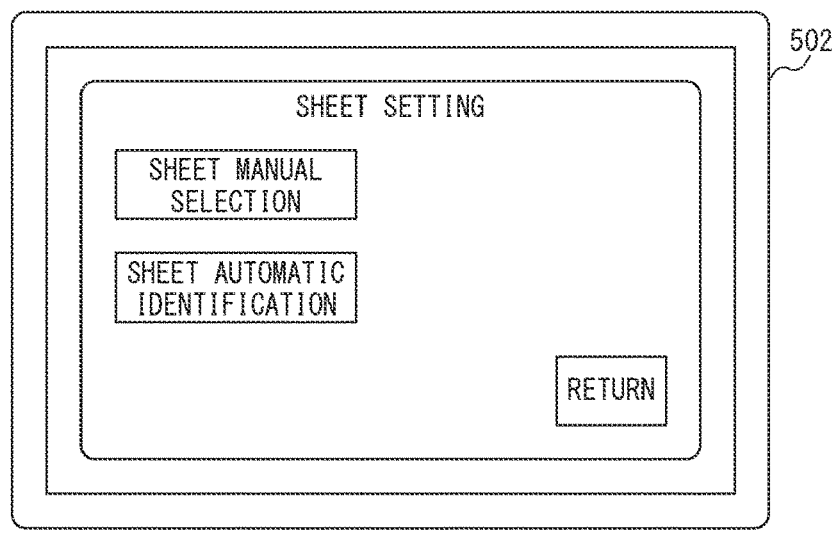
FIG. 10 is an exemplary view of an operation screen.
Figure 11:
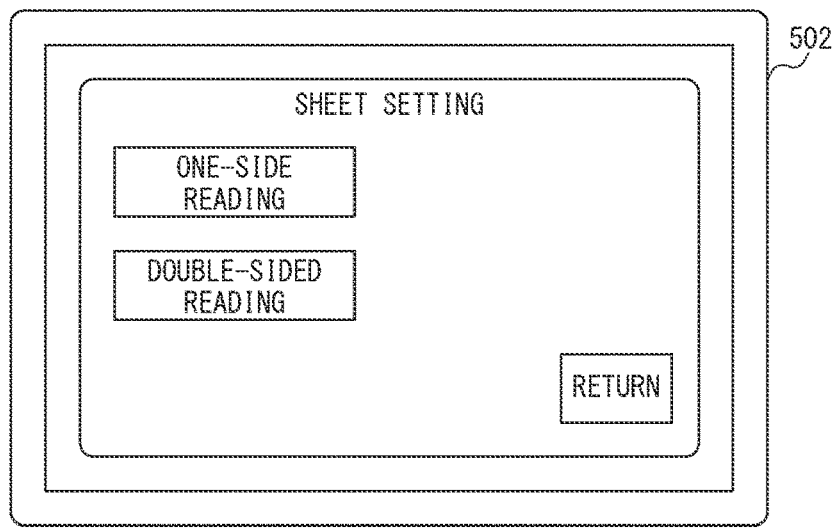
FIG. 11 is an exemplary view of an operation screen.
Figure 12:
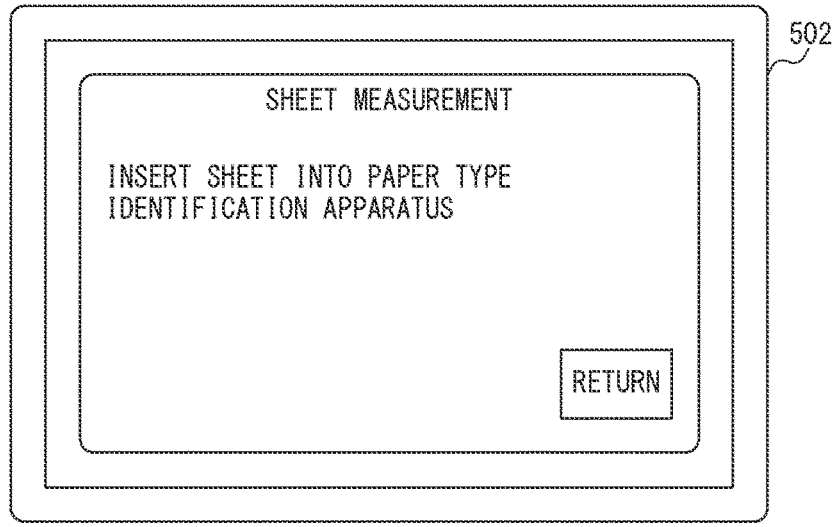
FIG. 12 is an exemplary view of an operation screen.
Figure 13:
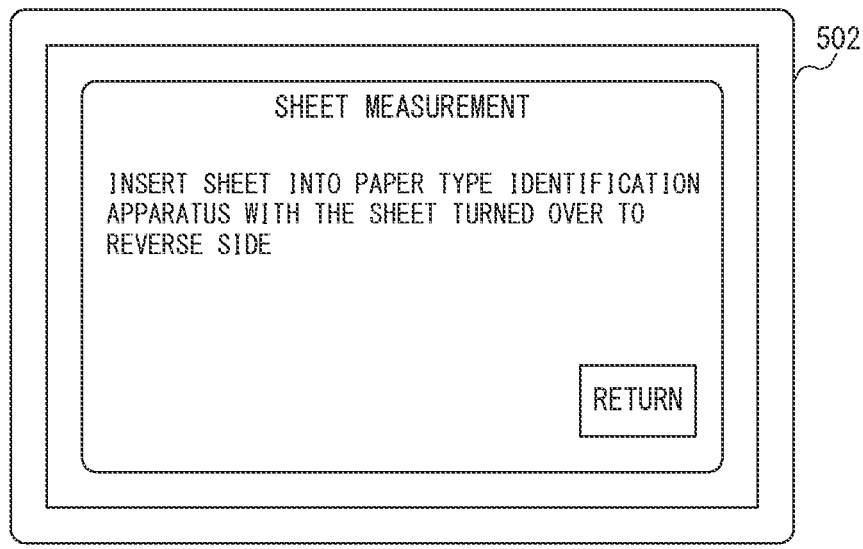
FIG. 13 is an exemplary view of an operation screen.

FIG. 9 is a flowchart for representing parameter acquisition processing for identifying the sheet type of the sheet S. FIG. 10, FIG. 11, FIG. 12, and FIG. 13 are exemplary views of operation screens displayed on a display of the operation unit 502 during the parameter acquisition processing. Upon using the sheet S, the user displays the operation screen shown in FIG. 10 on the display of the operation unit 502. This operation screen includes a "sheet manual selection" button and a "sheet automatic identification" button. The "sheet manual selection" button allows a user to manually input a type of the sheet S. The "sheet automatic identification" button allows the paper type identification apparatus 100 to automatically select a type of the sheet S. In this embodiment, in response to selection of the "sheet automatic identification" button by a user from the selection screen with use of the operation unit 502, the selected content is input to the controller 400.

In a case where the controller 400 acquires the information indicating that the "sheet automatic identification" button has been selected from the operation unit 502, the controller 400 sets an operation mode to an automatic identification mode for the sheet S (Step S1). Upon setting the automatic identification mode, the controller 400 instructs the information processing unit 160 of the paper type identification apparatus 100 to measure the sheet S. According to this instruction, the information processing unit 160 performs initialization processing for the mechanical physical property measurement unit 102 and the surface property measurement unit 103. Further, the controller 400 displays, in a case where the automatic identification mode is set, the operation screen shown in FIG. 11 on the display of the operation unit 502. This operation screen contains a "one-side reading" button for measuring only one side of the sheet S. and a "double-sided reading" button for measuring both sides of the sheet S. The user selects, by selecting one of the buttons, one of one-side measurement of the sheet S or the double-sided measurement of the sheet S. The controller 400 acquires information representing that "one-side reading" button has been selected or "double-sided reading" button has been selected from the operation unit 502 (Step S2). After selecting the surface to be measured, the controller 400 displays the operation screen shown in FIG. 12 on the display of the operation unit 502 to thereby instruct the user to insert the sheet S (Step S3). The user starts insertion of the sheet S in the groove portion 101 of the paper type identification apparatus 100, according to this operation screen.

After completion of an initialization process in the process of Step S1, the information processing unit 160 waits for the insertion of the sheet S in the groove portion 101. Due to the insertion of the sheet S in the groove portion 101 by the user according to the operation screen of FIG. 12, the information processing unit 160 starts measurement of the feature amount of the front surface (first surface) of the sheet S (Step S4). The measurement of the feature amount is performed as follows. It is noted that, after completion of the measurement of the feature amount of the front surface (first surface), the information processing unit 160 notifies the controller 400 of completion of the measurement.

Triggered by the detection of the sheet S by the upstream sheet sensor 104, the information processing unit 160 controls the surface property measurement unit 103 (optical sensor 150) to start measurement of one or more surface properties of the sheet S after a predetermined time t1 has elapsed. The information processing unit 160 controls the optical sensor 150 to read the sheet S, and sequentially acquires the reading results (detection values). The optical sensor 150 measures the surface property of the sheet S by scanning the conveyed sheet S two or more times at intervals of predetermined time. The information processing unit 160 performs the above described processes to the reading result (detection value) by the optical sensor 150, and generates the surface property information to accumulate the same in an internal memory.

Figure 14:
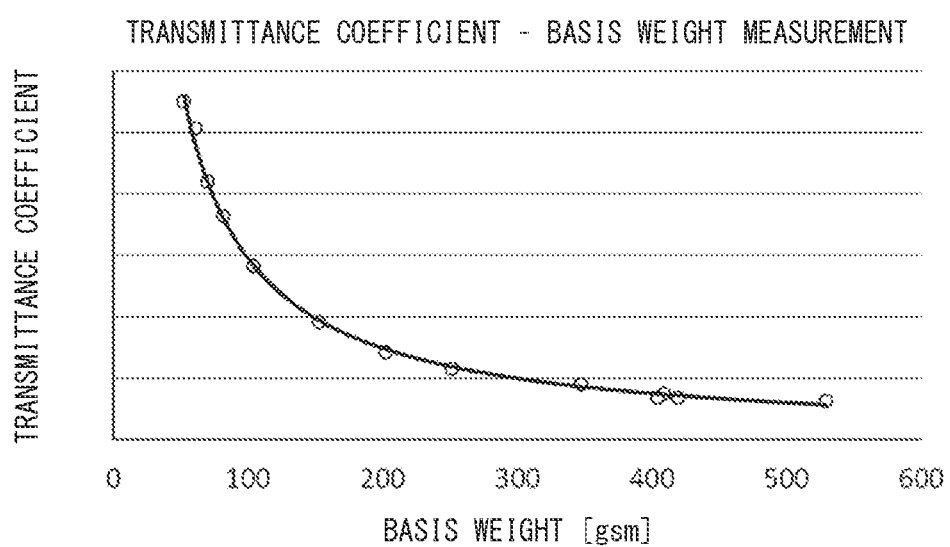
FIG. 14 is a graph explaining relationship between transmittance of ultrasonic waves and basis weight.

The information processing unit 160 controls the mechanical physical property measurement unit 102 to start measurement of one or more physical properties of the sheet S after a predetermined time t2 has elapsed from the detection of the sheet S by the upstream sheet sensor 104. The information processing unit 160 measures a transmittance of the sheet S for ultrasonic waves with use of the ultrasonic wave sensor 120, converts the measurement values into pieces of basis weight information, and accumulates the pieces of basis weight information in the memory. FIG. 14 is an explanatory graph of a relationship between the transmittance of ultrasonic waves and the basis weight. The information processing unit 160 holds a conversion formula or a conversion table indicating such relationship between the transmittance of ultrasonic waves and the basis weight. The information processing unit 160 performs the conversion of the measured value into the basis weight with use of such conversion formula or conversion table. As a result, measurement of physical properties, the basis weight information of the sheet S is stored in the memory of the information processing unit 160. Further, triggered by the detection of the sheet S by the upstream sheet sensor 104, the information processing unit 160 awaits counts from pulse signals output from the sheet thickness sensor 140.

The information processing unit 160 waits until the downstream sheet sensor 105 detects the sheet S. The downstream sheet sensor 105 detects the sheet S when the sheet S is inserted up to the innermost abutment portion 108. In a case where the downstream sheet sensor 105 detects the sheet S, the information processing unit 160 acquires the pulse signal, which is the measurement value, from the sheet thickness sensor 140. The information processing unit 160 measures the sheet thickness of the sheet S based on the number of acquired pulse signals (pulse count). The sheet thickness of the sheet S is accumulated in the memory of the information processing unit 160. In a case where the downstream sheet sensor 105 detects the sheet S, the information processing unit 160 stops reading of the sheet S by the optical sensor 150 of the surface property measurement unit 103.

After receiving the completion of the measurement of the feature amount of the surface from the information processing unit 160, the controller 400 checks whether the one-side measurement or the double-sided measurement has been selected in the process of Step S2 (Step S5). In a case where the one-side measurement has been selected (Step S5: Y), the controller 40 acquires the surface measurement result (feature amount) of the front surface (first surface) from the information processing unit 160 to perform the paper type identification process, which is described later, and displays brand candidates for the sheet on the display of the operation unit 502 (Step S6). The user checks the brand candidates displayed on the display to determine whether to measure the back surface (second surface) or not. The user instructs whether to measure the back surface by the operation unit 502 according to the determination result. For example, the user determines to measure the back surface in a case where the user's own expected brand is not included in the brand candidates.

The controller 400 acquires instructions of whether to measure the back surface or not from the operation unit 502 (Step S7). In a case where it is determined to not measure the back surface (Step S7: N), the controller 400 ends the parameter acquisition processing. In a case where it is determined to measure the back surface (Step ST Y), the controller 400 displays the operation screen shown in FIG. 13 on the display of the operation unit 502 to thereby instruct the user to insert the sheet S (Step S8). Further, in a case where the double-sided measurement has been selected, (Step S5: N), the controller 400 does not perform the processes of Steps S6 and S7, rather it displays the operation screen shown in FIG. 13 on the display of the operation unit 502 to thereby instruct the user to insert the sheet S (Step S8). With the operation screen of FIG. 13, a notification is given to the user, and the notification is to urge the user to insert the sheet S into the paper type identification apparatus 100 with the front surface and the back surface of the sheet S reversed.

The information processing unit 160 measures the feature amount of the back surface (second surface) of the inserted sheet S by the same process as the process of Step S4 (Step S9). It is noted that, after completion of the measurement of the feature amount of the back surface (second surface), the information processing unit 160 notifies the controller 400 of the completion of the measurement. After receiving the completion of the measurement of the feature amount of the back surface from the information processing unit 160, the controller 400 acquires the measurement result (feature amount) of both the front surface and the back surface from the information processing unit 160 to perform the paper type identification process, which is described later, and displays brand candidates for the sheet on the display of the operation unit 502 (Step S10). The parameter acquisition process is completed as described above.

Figure 15:
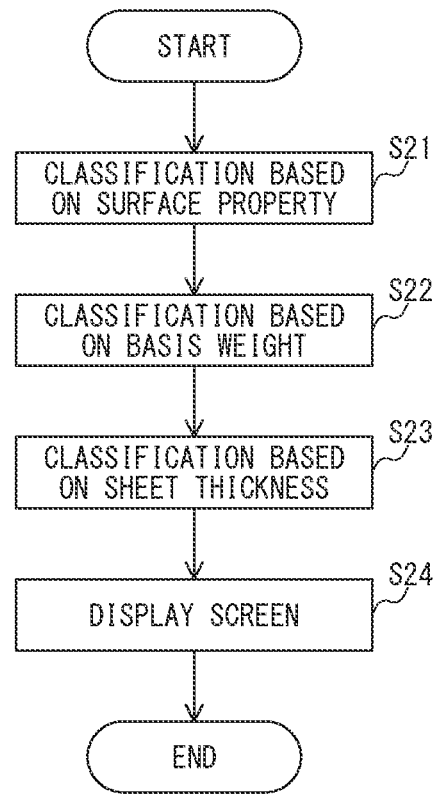
FIG. 15 is a flowchart illustrating a paper type identification process.

FIG. 15 is a flowchart for representing the sheet type identification processing performed in the process of Step S6 and the process of Step S10. Here, the paper type identification process is described for each of one-side measurement (process of Step S6) and double-sided measurement (process of Step S10).

Figure 16:
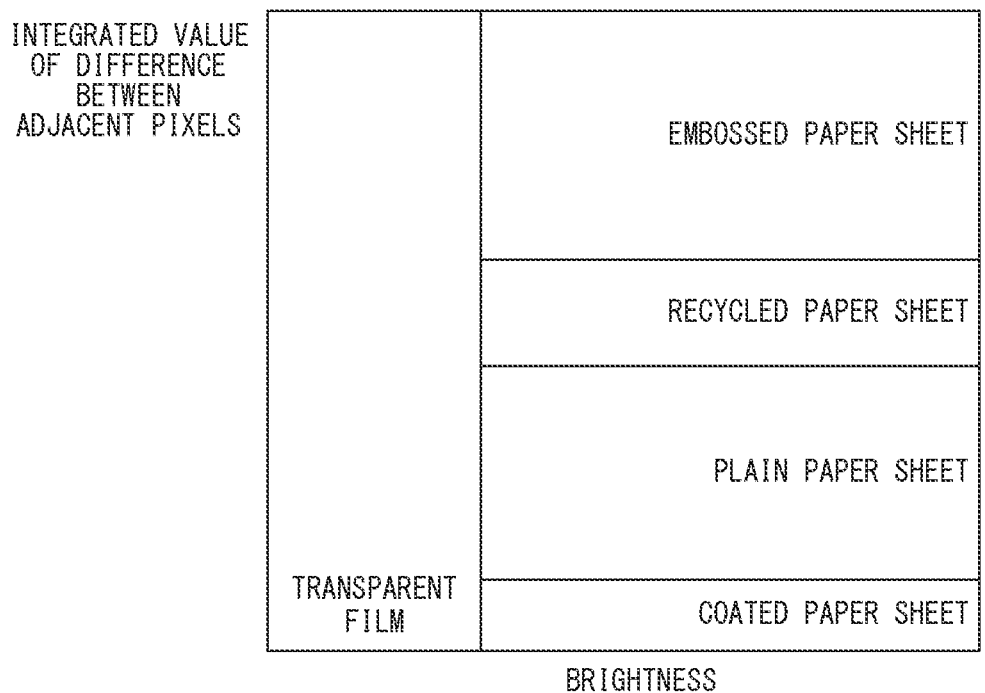
FIG. 16 is an explanatory diagram illustrating classification of surface properties.

In a case of one-side measurement, the controller 400 identifies the paper type based on the measurement result (feature amount) of the front surface (first surface). The controller 400 performs classification of the type of the sheet S based on the measurement results of the surface property of the sheet S (Step S21). FIG. 16 is an explanatory diagram of the classification of the surface properties. In FIG. 16, surface properties of the sheets S are measured and classified in advance, as indices of surface properties, with use of a matrix including the vertical axis representing the integrated value of difference between adjacent pixels and the horizontal axis representing the brightness. The controller 400 classifies the type of the sheet S by referring to the matrix based on the surface property information (integrated value of difference between adjacent pixels and brightness) that are obtained from the detection value detected by the optical sensor 150. The controller 400 classifies the type of the sheet S by selecting, in the brands in the paper type database 402, a brand having the first surface property that matches the measurement result (surface property information).

The controller 400 selects, in the classification by the surface property, brands having basis weight within a predetermined range (for example, +5 gsm) from the measured basis weight (Step S22). Further, the controller 400 selects, in the selected brands, brands having sheet thickness within a predetermined range (for example, +5 μm) from the measured sheet thickness (Step S23). The controller 400 displays the brand candidates for the selected sheet on the display of the operation unit 502 (Step S24). By using the basis weight and the sheet thickness for the parameter of paper type selection as well as the surface property information, further selection of the brand is performed and brand identification accuracy is improved.

FIG. 17 is an explanatory view of the brand candidate screen displayed in this way. The brand candidate screen of FIG. 17 is displayed in the process of Step S6 in FIG. 9. In the brand candidate screen shown in FIG. 17, a "sheet automatic identification back surface measurement" button is provided so that measurement of the back surface can be instructed in the process of Step S7. By selecting this button, it is determined that the measurement of the back surface will be performed in the process of Step S7. The character of "recommended" is labeled on the paper type that best matches in the measurement result by the mechanical physical property measurement unit 102 and the surface property measurement unit 103.

In the double-sided measurement, the controller 400 identifies the paper type, as in the single-sided measurement, based on the surface property information (integrated value of difference between adjacent pixels and brightness) of each of the front surface and the back surface. Since the measured value of the basis weight is detected from the transmissivity of the ultrasonic wave, as to the front surface and the back surface, there is no difference in the measured value. Also, in the sheet thickness, as to the front surface and the back surface, there is no difference in the measured value. Therefore, as to the basis weight and the sheet thickness, the average value of measured value of the front surface and that of the back surface is used.

The controller 400 identifies the paper type based on the measurement result (feature amount) of the front surface (first surface) and that of the back surface. The controller 400 performs classification of the type of the sheet S based on the measurement results of the front surface property and the back surface property of the sheet S (Step S21). The controller 400 selects, in the brands in the paper type database 402, a brand having the first surface property that matches the measurement result of the front surface (surface property information) and having the second surface property that matches the measurement result of the back surface (surface property information). Hereinafter, the brand selected at this time is referred to as "first brand." It is noted that, in the measurement of the sheet S, the user might insert the sheet S with the front surface and the back surface reversed. Therefore, the controller 40 selects, in the brands in the paper type database 402, a brand (second brand) having the first surface property that matches the measurement result of the back surface (surface property information) and having the second surface property that matches the measurement result of the front surface (surface property information). Thus, the classification of the type of sheet S is performed.

The controller 400 selects, in the classification by the surface property (first brand and second brand), brands having basis weight within a predetermined range (for example, ±5 gsm) from the measured basis weight (Step S22). Further, the controller 400 selects, in the selected brands, brands having sheet thickness within a predetermined range (for example, ±5 µm) from the measured sheet thickness (Step S23). The controller 400 displays the brand candidates for the selected sheet on the display of the operation unit 502 (Step S24). By using the basis weight and the sheet thickness for the parameter of paper type selection as well as the surface property information, brand identification accuracy is improved.

FIG. 18 is an explanatory view of the brand candidate screen displayed in this way. The brand candidate screen of FIG. 18 is displayed in the process of Step S10 in FIG. 10. To accommodate when the paper type which the user wishes to select is not included in the brand candidates, a "sheet automatic identification remeasurement" button is provided in the brand candidate screen of FIG. 18. By selecting this button, the process shown in FIG. 9 is performed again. The character of "recommended" is labeled on the paper type that best matches in the measurement result by the mechanical physical property measurement unit 102 and the surface property measurement unit 103.

As described above, the paper type identification apparatus 100 of the present embodiment notifies a user, after the measurement of one surface of the sheet has been completed, to reverse sheet S and insert the same. By measuring the back surface, incorrect detection of the brand classification due to the influence of the difference of the feature amount of front surface and the back surface can be prevented. Thus, even in a case where a measurement device that can perform only one-sided measurement is used, the paper type identification apparatus 100 of the present embodiment can accurately identify the paper type of the sheet.

The information processing unit 160 is provided inside the paper type identification apparatus 100, and the information processing unit 160 processes the measurement results given by the mechanical physical property measurement unit 102 and the surface property measurement unit 103 and sends the processed results to the controller 400 of the image forming apparatus 201. However, the processing of those measurement results may be performed directly by the controller 400. In this case, the functions of the information processing unit 160 are included in the controller 400. Further, the paper type identification apparatus 100 sends the measurement results given by the mechanical physical property measurement unit 102 and the surface property measurement unit 103 directly to the controller 400.

In this embodiment, the image forming apparatus 201 includes the paper type database 402. However, the paper type identification apparatus 100 may include the paper type database 402. In this case, specification of a brand of the sheet S performed by the controller 400 is performed by the information processing unit 160 of the paper type identification apparatus 100. Further, description has been made of the example in which the sheet detection by the upstream sheet sensor 104 is used as a trigger for starting the process. However, it is also possible to use the sheet detection by the downstream sheet sensor 105 as a trigger for starting the process. In this case, the surface property measurement is performed at the time of drawing out the sheet S from the paper type identification apparatus 100. The encoder rotation of the sheet thickness sensor 140 may be detected in place of the encoder rotation of the downstream sheet sensor 105, and the zone of reading by the surface property measurement unit 103 may be determined based on the timing of the detection.

In the above, description has been made of the example in which the operation conditions (control parameters) of the image forming apparatus 201 are determined through selection of a sheet classification and a sheet brand in accordance with characteristics detected by the paper type identification apparatus 100. The paper type identification apparatus 100 may be a sheet physical property measurement device, and may determine control parameters directly from measured feature amounts (physical property values) of a sheet. Further, the paper type database 402 and the controller 400 may be provided on a cloud. In such a case, as long as the image forming apparatus 201 is connected to the cloud via a network, the latest sheet type setting information and identification algorithm can always be selected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056636, filed Mar. 30, 2022, which is hereby incorporated by reference herein in its entirety.

What is claimed is:

1. A paper type identification apparatus comprising:
a passage configured to allow a sheet to be manually inserted thereinto;
a reading sensor configured to read a surface of the sheet inserted into the passage; and
a controller configured to:
output a notification after reading a first surface of the sheet by the reading sensor, the notification being a notification to urge a user to read a second surface opposite to the first surface of the sheet by the reading sensor; and
determine a type of the sheet based on a reading result of the first surface by the reading sensor and a reading result of the second surface by the reading sensor.

2. The paper type identification apparatus according to claim 1, further comprising a display to display the type of the sheet.

3. The paper type identification apparatus according to claim 1, wherein the controller is configured to:
perform a first mode and a second mode, the first mode being a mode in which the type of the sheet is determined based on both the reading result of the first surface by the reading sensor and the reading result of the second surface by the reading sensor, and the second mode being a mode in which the type of the sheet is determined based on the reading result of the first surface by the reading sensor; and output, in the first mode, after reading the first surface of the sheet by the reading sensor, the notification to urge the user to read the second surface of the sheet by the reading sensor.

4. The paper type identification apparatus according to claim 3,
wherein the controller is configured to:
not urge, in the second mode, after reading the first surface of the sheet by the reading sensor, the user to read the second surface of the sheet by the reading sensor; and
determine the type of the sheet based on the reading result of the first surface by the reading sensor.

5. The paper type identification apparatus according to claim 3, wherein the controller is configured to:
receive user instruction information to instruct to perform the first mode; and
select the first mode based on the user instruction information.

6. The paper type identification apparatus according to claim 3, further comprising: a display to display a screen to allow the user to select whether to perform the first mode,
wherein the display is configured to display the screen after reading the first surface of the sheet by the reading sensor.

7. The paper type identification apparatus according to claim 1, further comprising: a sheet sensor configured to detect the sheet that has arrived at a detection position downstream of the reading sensor in an insertion direction in which the sheet is inserted,
wherein the controller is configured to acquire the reading result of the first surface that is read by the reading sensor after detecting the sheet by the sheet sensor.

8. An image forming apparatus for forming an image on a sheet based on an image forming condition, the image forming apparatus comprising:
a passage configured to allow a sheet to be manually inserted thereinto;
a reading sensor configured to read a surface of the sheet inserted into the passage;
a display; and
a controller configured to:
control the display to display a screen after reading a first surface of the sheet by the reading sensor, the screen being a screen to urge a user to read a second surface opposite to the first surface of the sheet;
control the display to display a plurality of candidates of a type of the sheet based on a reading result of the first surface by the reading sensor and a reading result of the second surface by the reading sensor; and
control the image forming conditions based on the type of the sheet selected from among the plurality of candidates displayed on the display.

9. The image forming apparatus according to claim 8, wherein the controller is configured to:
perform a first mode and a second mode, the first mode being a mode in which the controller controls the display to display the plurality of candidates for the type of the sheet based on both the reading result of the first surface by the reading sensor and the reading result of the second surface by the reading sensor, and the second mode being a mode in which the controller controls the display to display the plurality of candidates for the type of the sheet based on the reading result of the first surface by the reading sensor; and
control, in the first mode, after reading the first surface of the sheet by the reading sensor, the display to display the image.

10. The image forming apparatus according to claim 9, wherein the controller is configured to:
not display, in the second mode, after reading the first surface of the sheet by the reading sensor, the screen; and
control the display to display the plurality of the candidates for the type of the sheet based on the reading result of the first surface by the reading sensor.

11. The image forming apparatus according to claim 9, wherein the controller is configured to:
receive user instruction information to instruct to perform the first mode; and
select the first mode based on the user instruction information.

12. The image forming apparatus according to claim 9, wherein the controller is configured to control the display to display a selection screen to allow the user to select whether to perform the first mode after reading the first surface of the sheet by the reading sensor.

13. The image forming apparatus according to claim 8, further comprising:
a sheet sensor configured to detect the sheet that has arrived at a detection position downstream of the reading sensor in an insertion direction in which the sheet is inserted,
wherein the controller is configured to acquire the reading result of the first surface that is read by the reading sensor after detecting the sheet by the sheet sensor.

* * * * *